3,655,822
Patented Apr. 11, 1972

3,655,822
THERMOPLASTIC POLYMER ALLOY
James E. McGrath, Somerville, and Markus Matzner, Edison, N.J., assignors to Union Carbide Corporation, New York, N.Y.
No Drawing. Filed Oct. 12, 1970, Ser. No. 80,222
Int. Cl. C08g 41/04, 22/00
U.S. Cl. 260—857 TW          11 Claims

ABSTRACT OF THE DISCLOSURE

An alloy of thermoplastic polymer is provided by a blend of (a) a polylactam-polyarylene polyether block copolymer and (b) polylactams and/or polyarylene polyethers.

BACKGROUND OF THE INVENTION (1) Field of the invention

The invention relates to moldable thermoplastic resin systems comprising lactam polymers and polyarylene polyether polymers.

(2) Description of the prior art

Polyarylene polyether resins, and particularly the polysulfone resins, are thermoplastic molding resins which have relatively poor chemical resistance and relatively poor environmental stress aging characteristics. Several approaches have been made in an effort to improve these deficiencies and thereby improve the utility of the polyarylene polyether resins in end-use applications which require relatively good chemical resistance properties and good environmental stress aging characteristics. One approach which has provided some improvement in the environmental stress aging characteristics of the polyarylene polyether resins, such as the polysulfone resins, is the cross-linking of the polymer. This procedure, however, results in a non-processable resin. Blending the polyarylene polyether resins with other resins has also provided some improvement in environmental stress-aging characteristics. This is somewhat true in the case where crystalline polymers are blended with the polyarylene polyethers since crystalline polymers are known to improve stress crack reisstance or to have improved stress crack resistance properties themselves. Blends of polyethylene terephthalate and polyarylene polyethers such as polysulfone resins, for example, exhibit relatively good stress crack resistance properties above 30 weight percent of polyethylene terephthalate. However, the mechanical properties of these blended compositions are marginal.

Attempts have also been made to improve the properties of nylon polymers which are highly crystalline thermoplastic molding resins but which have poor heat distortion temperature (HDT) properties, and poor water adsorption characteristics. Such poor properties tend to mitigate against the use of the nylon materials under high temperature conditions and/or in electrical equipment applications.

When attempts were made to improve the properties of both the polyarylene polyethers and the nylon polymers together, by blending such polymers it was found that these two types of polymeric materials were inherently incompatible. It was not possible to provide a physical admixture of these two classes of polymeric materials which would have useful properties because the resulting blends were very brittle.

SUMMARY OF THE INVENTION

Novel alloys of thermoplastic polymeric resins are prepared from (a) lactam block polymers and (b) polyarylene polyether polymers and/or nylon polymers.

An object of the present invention is to provide novel alloys of polymers containing polymeric lactam chains and polyarylene polyether chains.

A further object of the invention is to provide a means for improving the properties of both nylon polymers and polyarylene polyether polymers.

DESCRIPTION OF THE PREFERRED EMBODIMENT

It has now been found that the objects of the present invention may be accomplished by preparing alloys of (a) polylactam-polyarylene polyether block copolymer and (b) nylon and/or polyarylene polyether polymers.

THE POLYMERIC ALLOYS

The alloys which are prepared and used in accordance with the present invention comprise about (a) 10 to 90% by weight, based on the weight of the total composition, of one or more block copolymers which comprise blocks of lactam polymer and blocks of polyarylene polyether, and (b) 90 to 10% by weight, based on the weight of the total composition, of one or more nylon polymers and/or polyarylene polyether polymers.

The preferred alloys of the present invention are prepared from (a) block copolymers containing blocks of poly-ε-caprolactam and blocks of polysulfone resins and (b) homopolymers of poly-ε-caprolactam as the nylon polymer, and/or polysulfone as a polyarylene polyether polymer.

The alloys of the present invention are prepared by blending the polymeric components thereof in the desired weight percents of such components at elevated temperatures of the order of about 220 to 280° C. in conventional thermoplastic polymer milling or blending equipment such as two or three roll mills, extruders having one or more screws, Banbury mixers, Brabenders and any other internal mixing device known to those skilled in the art. During these milling or extruding operations provisions may be made for venting, from the blends, volatile materials, such as moisture and unreacted lactam monomer.

The polymeric blends may also be prepared by dissolving the polymeric components in mutual solvents and by then evaporating the solvent from the resulting solutions. Examples of solvents which may be used in this regard are the following: m-cresol, chlorinated phenols, and the like.

The alloy systems of the present invention may also contain up to about 1 to 40 weight percent, based on the total weight of such system, of one or more adjuvant materials such as fillers, stabilizers, fibrous reinforcing agents such as asbestos and glass fiber, pigmenting materials, impact modifiers and the like.

The adjuvant materials may be added to the alloys during the milling or other blending operation in which the polymeric materials are blended together. The adjuvant materials may also be added to one or more of the polymeric materials during the formation of the polymeric components. For example, some of the reinforcing agents or fillers or the like could be added to the lactam monomer during the formation of the polylactam-polyarylene polyether block copolymer or the nylon polymer, or added to the polyarylene polyether.

The particular alloy being prepared, as well as the end use application, will dictate the selection and quantity of the various adjuvants to be employed therewith, since it is the respective adjuvants for the polymeric components of the alloy systems, and such end-use applications, that are to be employed in the present invention. The adjuvants employed must be physically and chemically compatible with each of the other components of the compositions in which they are used under the prescribed operating conditions. As such, where they may be present during a polymerization reaction the adjuvants should not contain reactive groups which would interfere with the polymerization reactions, such as active hydrogen containing groups such as carboxyl, amino, mercaptan, or hydroxyl groups. The adjuvants should also be materials which are stable at the polymerization or blending conditions, such as the operating temperature conditions, which may be employed.

The adjuvants would be used in amounts which would be effective for the intended purpose. Thus, a stabilizer would be used in a stabilizingly effective quantity, and the fillers would be used in effective quantities therefore. For example, if a reinforcing filler were to be used such a filler should be used in such amounts to provide the desired reinforcing effect. An impact modifier would be used in impact modifying amounts.

All of the components of the blends of the present invention should be admixed together so as to provide as homogeneous a composition as possible.

The alloys made in accordance with the present invention may be used for a number of applications which require the use of molded articles prepared from thermoplastic resins such as fibers, films, engineering structures, coatings and hollow articles such as tubing and solvent tanks, electrical switches and sheeting.

The nylon polymers which are used in the alloys of the present invention include all solid thermoplastic nylon materials such as, nylon 6 (e.g., polycaprolactam), nylon 6/6 (e.g., hexamethylenediamine-adipic acid polycondensate), nylon 6/10(hexamethylenediamine - sebacic acid polycondensate), nylon 11 (11-amino-undecanoic acid polycondensate) and nylon 12 (12-amino-dodecanoic acid polycondensate).

The nylon polymers may be prepared anionically or hydrolytically from the lactam monomers listed below, or by condensing $C_2$ to $C_{20}$ dicarboxylic acids such as adipic acid, sebacic acid, 1,12-dodecanedioic acid, glutaric acid, 1,5-dicarboxyheptane, 2,4-dicarboxyoctane, and the like, with $C_2$ to $C_{20}$ diamines such as 1,6-hexamethylenediamine, ethylene diamine, trimethylene diamine, 1,4-butylene diamine, 1,3-butylene diamine, 1,7-heptamethylene diamine, 3,7-diamino-nonane, and the like; or by condensing $C_4$ to $C_{15}$ aminoalkanoic acids such as 11-aminoundecanoic acid, 12 - aminododecanoic acid, 6 - aminocaproic acid, 7-amino-1-carboxyheptane and 1-carboxy-14-aminopentadecane.

The nylon materials have molecular weights of about 15,000 to 100,000; melting points of about 50 to 280° C., and melt indices (as measured by ASTM D-1238-65T) of about 10 to 15. These nylon materials include all the compression, extrusion, injection and blow molding grades of such polymers.

The polyarylene polyether materials which are used, as such, in the present invention are solid thermoplastic materials having repeating units of the structure

where E and E' are as defined below. These polyarylene polyether materials will have molecular weights of about 10,000 to 100,000; second order glass transition temperatures of about 130 to 320° C.; and melt indices of about 1 to 20. The preferred of these polyarylene polyether materials are polysulfone resins having repeating units of the structure

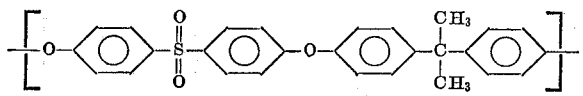

The polysulfone resins have molecular weights of about 15,000 to 50,000 as indicated by reduced viscosity values of about 0.4 to 0.7 dl./gm. at a concentration of 0.2 g./100 ml. in $CHCl_3$ at 25° C.

In order to insure optimum alloying of the block copolymers with the polyarylene polyethers or with the nylon polymers, it is preferable that the backbone of the nylon and polyarylene polyether block segments of the block copolymers have the same structure as the backbones of the nylon or polyarylene polyethers with which the block copolymers are being alloyed.

The polylactam/polyarylene polyether block copolymers which are used in the blends of the present invention are prepared and described as disclosed below.

The block copolymers may be prepared from lactam monomer and polyarylene polyethers by anionically polymerizing the lactam monomer with a catalyst-initiator system which comprises, as the initiator or activator, one or more of certain polyarylene polyethers.

THE LACTAMS

The lactams which may be used to prepare the block copolymers are all those which are capable of being polymerized anionically and are preferably those lactam monomers which contain at least one ring group of the structure

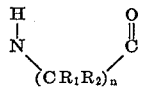

wherein $n$ is a whole number which is 3 to 15, and preferably 3 to 10, and $R_1$ and $R_2$ may be the same or different radicals on each carbon atom and may be H or $C_1$ to $C_{10}$ hydrocarbon.

Such lactams would include those having a single ring structure such as 2-pyrrolidone, 2-piperidone, 6-methyl-2-piperidone, ε-caprolactam, enantholactam, capryllactam, lauryllactam, decanolactam, undecanolactam, dodecanolactam, pentadecanolactam, hexadecanolactam, alkyl substituted caprolactams, aryl substituted lactams, and the like.

Lactams having a plurality of ring structures which may be used in the present invention include bislactams such as alkylene bis-lactams of the formula:

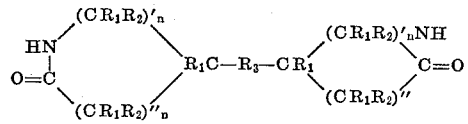

wherein $n'$ and $n''$ are each whole numbers such that $n'$ and $n''$ are each 2 to 14; $R_1$ and $R_2$ are as defined above; and $R_3$ may be $C_1$ to $C_4$ alkylene such as methylene, ethylene, propylene, and butylene; phenylene and substituted phenylene; O and S.

Other lactams having a plurality of ring structures include bicyclic lactams, such as those represented by the formulae:

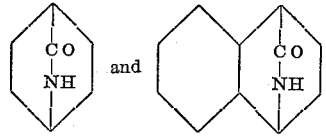

The lactams to be polymerized in the block copolymers can be used individually or in any combination thereof.

THE INITIATOR

The initiator which is to be employed in the preparation of the block copolymers of the present invention is a polymeric material which is commonly known as a polyarylene polyether. The polyarylene polyether initiators which are contemplated for use in the present invention have molecular weights of the order of about 800 to 100,000.

The initiator of the present invention has the structure:

I
$$X\left[O-E-O-E'\right]_m X'$$

wherein
X is H, R, COHal, COOR, —AR—Hal, —Ar—OR, —Ar—COHal, —Ar—COOR, —Ar—OCOOR, —Ar—SO₂Hal —Ar—SO₃R, SO₂—Ar—Hal, —Ar—OH, —Ar—CO—Ar—Hal —Ar—SO₂—Ar—Hal, —Ar—SO₂—Ar—OR;

—Ar—SO₂—Ar—OH

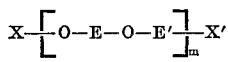

—R'(COOR)₂, —R'(COHal)₂, —R'''—COOR,

—R'''—COHal

—R'''—NCO, —Ar—NCO, —Ar—R'''—NCO,

—R'''—SO₂NCO

—Ar—SO₂NCO or —Ar—R'''—SO₂NCO,
X' is Hal, NCO, OH, OR, OCOHal, SO₂Hal, SO₂NCO, —Ar—OH, COHal, COOR, —Ar—Hal,

—Ar—OR

—Ar—COHal, —Ar—COOR, —Ar—OCOOR,

—Ar—SO₂Hal

—Ar—SO₃R, SO₂—Ar—Hal, —Ar—CO—Ar—Hal,

—Ar—SO₂—Ar—Hal, —Ar—SO₂—Ar—OR

—Ar—SO₂—Ar—OH

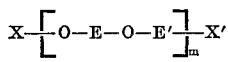

—R'(COOR)₂, —R'''—COHal, —R'(COHal)₂,

—R'''—COOR

—R'''—NCO, —Ar—NCO, —Ar—R'''—NCO,

—R'''—SO₂NCO

—Ar—SO₂NCO or —Ar—R'''—SO₂NCO,

Hal is Cl, F, Br or I; Ar is either a divalent heterocyclic moiety residue containing carbon and oxygen, or nitrogen or sulfur atoms in its ring structure, or Ar is a divalent mono- or polynuclear aryl moiety residue, R, R''' and R' are mono-, di- and trivalent, respectively, $C_1$ to $C_{20}$ hydrocarbon radicals; $m$ is a whole number of about 2 to 500 and E and E' are as defined below.

The R, R''', R' and Ar radicals may also be substituted with inert substituents, i.e., substituents which will not react with any of the components of the polymerization systems of the present invention, or with any of the polymers made therewith.

The term $C_1$ to $C_{20}$ hydrocarbon includes all saturated or unsaturated hydrocarbon radicals containing 1 to about 20 carbons and which are mono-, di- or trivalent, such as aliphatic radicals, such as methyl, methylene, methylidyne, ethyl, vinylene, vinyl, ethynyl, ethylidyne, propyl, isopropenyl, propenyl, propylidene, cyclopropyl, isopropyl, butyl, cyclobutyl, butenyl, isobutyl, amyl, isoamyl, cyclopentyl, hexyl, isohexyl and cycloheptyl; aromatic radicals such as phenyl, phenylene, methylphenylene, tolyl, benzyl, styryl, benzylidene, cumenyl, biphenyl, biphenylyl, biphenylylene, naphthyl, and naphthylene; and heterocyclic radicals such as pyridyl, pyridylidene and furfuryl.

The term heterocyclic moiety residue means the heterocyclic residue of a heterocyclic compound and the term aryl moiety residue means the carbocyclic residue of an aryl compound, which may be mono- or polynuclear in nature.

Where more than one Hal, R, R''', R' and/or Ar are present in the structure of an initiator such radicals may be the same or different.

E is the residuum of a dihydric phenol and E' is the residuum of a benzenoid compound having an inert electron withdrawing group in at least one of the positions ortho and para to the valence bonds, and both of said residua are valently bonded to the ether oxygen atoms through aromatic carbon atoms.

The residua E and E' are referred to in this manner since the polyarylene polyether polymer is conveniently made by the reaction of an alkali metal double salt of a dihydric phenol and a dihalobenzenoid compound having the electron withdrawing group by techniques as described herein.

The residuum E of the dihydric phenol can be, for instance, a mononuclear phenylene group as results from hydroquinone and resorcinol, or it may be a di- or polynuclear residuum. The residuum E can also be substituted with other inert nuclear substituents such as halogen, alkyl, alkoxy and like inert substituents.

It is preferred that the dihydric phenol be a weakly acidic dinuclear phenol such as, for example, the dihydroxy diphenyl alkanes or the nuclear halogenated derivatives thereof, which are commonly known as "bisphenols" such as, for example, the 2,2-bis-(4-hydroxyphenyl)propane, 1,1-bis-(4-hydroxyphenyl)-2-phenyl ethane, bis(4-hydroxyphenyl)methane, or the chlorined derivatives containing one or two chlorines on each aromatic ring. Other suitable dinuclear dihydric phenols are the bisphenols of a symmetrical or unsymmetrical joining group as, for example ether oxygen (—O—),

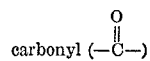

sulfide (—S—),

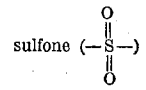

or hydrocarbon residue in which the two phenolic nuclei are joined to the same or different carbon atoms of the residue such as, for example, the bisphenol of acetophenone, the bisphenol of benzophenone, the bisphenol of vinyl cyclohexene, the bisphenol of α-pinene, and the like bisphenols where the hydroxyphenyl groups are bound to the same or different carbon atoms of an organic linking group.

Such dinuclear phenol can be characterized as having the structure

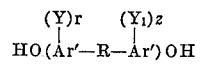

wherein Ar' is an aromatic group, and preferably is a phenylene group, Y and $Y_1$ can be the same or different inert substituent groups such as alkyl groups having from 1 to 4 carbon atoms, halogen atoms, i.e. fluorine chlorine, bromine, or iodine, or alkoxy radicals having from 1 to 4 carbon atoms, $r$ and $z$ are integers having a value of from 0 to 4, inclusive, and R is representative of a bond between aromatic carbon atoms as in dihydroxydiphenyl, or is a divalent radical, including for example, inorganic radicals such as

—O—, —S—, —S—S—, —SO₂—, and divalent organic hydrocarbon radical such as alkylene, alkylidene, cycloaliphatic, or the halogen, alkyl, aryl or like substituted alkylene alkylidene and cycloaliphatic radicals as well as aralkylene, alkarylene and aromatic radicals and a ring fused to both Ar' groups.

Examples of specific dihydric polynuclear phenols include among others: the bis-(hydroxyphenyl)alkanes such as 2,2-bis-(4-hydroxyphenyl)propane,
2,4'-dihydroxydiphenyl)methane,
bis-(2-hydroxyphenyl)methane,
bis-(4-hydroxyphenyl)methane,
bis-(4-hydroxy-2,6-dimethyl-3-methoxyphenyl)methane,
1,1,-bis-(4-hydroxyphenyl)ethane,
1,2-bis-(4-hydroxyphenyl)ethane,
1,1-bis-(4-hydroxy-2-chlorophenyl)ethane,
1,1-bis-(3-methyl-4-hydroxyphenyl) propane,
1,3-bis-(3-methyl-4-hydroxyphenyl)propane,
2,2-bis-(3-phenyl-4-hydroxyphenyl)propane,
2,2-bis-(3-isopropyl-4-hydroxyphenyl)propane,
2,2-bis-(2-isopropyl-4-hydroxyphenyl)propane,
2,2-bis-(4-hydroxynaphthyl)propane,
2,2-bis-(4-hydroxyphenyl)pentane,
3,3-bis-(4-hydroxyphenyl)pentane,
2,2-bis-(4-hydroxyphenyl)heptane,
bis-(4-hydroxyphenyl)phenylmethane,
2,2-bis-(4-hydroxyphenyl)-1-phenylpropane,
2,2-bis-(4-hydroxyphenyl)-1,1,1,3,3,3,-hexafluoropropane and the like;
Di(hydroxyphenyl)sulfones such as
bis-(4-hydroxyphenyl)sulfone,
2,4'-dihydroxydiphenyl sulfone,
5'-chloro-2,4'-dihydroxydiphenyl sulfone,
5'-chloro-4,4'-dihydroxydiphenyl sulfone, and the like;
Di(hydroxyphenyl)ethers such as
bis-(4-hydroxyphenyl)ether,
the 4,3'-, 4,2'-, 2,2'-, 2,3'-dihydroxydiphenyl ethers,
4,4'-dihydroxy-2,6-dimethyldiphenyl ether,
bis-(4-hydroxy-3-isobutylphenyl)ether,
bis-(4-hydroxy-3-isopropylphenyl)ether,
bis-(4-hydroxy-3-chlorophenyl)ether,
bis-(4-hydroxy-3-fluorophenyl)ether,
bis-(4-hydroxy-3-bromophenyl)ether,
bis-(4-hydroxynaphthyl)ether,
bis-(4-hydroxy-3-chloronaphthyl)ether,
4,4'-dihydroxy-3,6-dimethoxydiphenyl ether,
4,4'-dihydroxy-2,5-diethoxydiphenyl ether, and like materials.

It is also contemplated to use a mixture of two or more different dihydric phenols to accomplish the same ends as above. Thus when referred to above the E residuum in the polymer structure can actually be the same or different aromatic residua.

As used herein, the E term defined as being the "residuum of the dihydric phenol" refers to the residue of the dihydric phenol after the removal of the two aromatic hydroxyl groups. Thus it is readily seen that polyarylene polyethers contain recurring groups of the residuum of the dihydric phenol and the residuum of the benzenoid compound bonded through aromatic ether oxygen atoms.

The residuum E' of the benzenoid compound can be from any dihalobenzenoid compound or mixture of dihalobenzenoid compounds which compound or compounds have the two halogens bonded to benzene rings having an electron withdrawing group in at least one of the positions ortho and para to the halogen group. The dihalobenzenoid compound can be either mononuclear where the halogens are attached to the same benzenoid ring or polynuclear where they are attached to different benzenoid rings as long as there is the activating electron withdrawing group in the ortho or para position of that benzenoid nucleus.

Any of the halogens may be the reactive halogen substituents on the benzenoid compounds, fluorine and chlorine substituted benzenoid reactants being preferred.

Any electron withdrawing group can be employed as the activator group in the dihalobenzeneoid compounds. Preferred are the strong activating groups such as the sulfone group (—SO₂—) bonding two halogen substituted benzenoid nuclei as in the 4,4-dichlorodiphenyl sulfone and 4,4'-difluorodiphenyl sulfone, although such other strong withdrawing groups hereinafter mentioned can also be used with ease. It is further preferred that the ring contain no electron supplying groups on the same benzenoid nucleus as the halogen; however, the presence of other groups on the nucleus or in the residuum of the compound can be tolerated. Preferably, all of the substituents on the benzenoid nucleus are either hydrogen (zero electron withdrawing), or other groups having a positive sigma* value, as set forth in J. F. Bunnett in Chem. Rev., 49, 273 (1951) and Quart. Rev., 12, 1 (1958).

The electron withdrawing group of the dihalobenzenoid compound can function either through the resonance of the aromatic ring, as indicated by those groups having a high sigma * value, i.e. above about +0.7 or by induction as in perfluoro compounds and like electron sinks.

Preferably the activating group should have a high sigma* value, preferably above 1.0, although sufficient activity is evidenced in those groups having a sigma* value above 0.7.

The activating group can be basically either of two types;
(a) Monovalent groups that activate one or more halogens on the same ring as a nitro group, phenylsulfone, or alkylsulfone, cyano, trifluoromethyl, nitroso, and hetero nitrogen as in pyridine, or
(b) Divalent groups which can activate displacement of halogens on two different rings, such as the sulfone group —SO₂—; the carbonyl group —CO—; the vinyl group

sulfoxide group —SO—; the azo-group —N=N—; the saturated fluorocarbon groups —CF₂CF₂—; organic phosphine oxides

where R is a hydrocarbon group, and the ethylidene group

X—C—X
‖
—C— where X can be hydrogen or halogen or which can activate halogens on the same ring such as with difluorobenzoquinone, 1,4- or 1,5- or 1,8-difluoroanthraquinone.

If desired, the polyarylene polyether polymers may be made with mixtures of two or more dihalobenzeneoid compounds each of which has this structure, and which may have different electron withdrawing groups. Thus the E' residuum of the benzenoid compounds in the polyarylene polyether polymer structure may be the same or different.

It is seen also that as used herein, the E' term defined as being the "residuum of the benzenoid compound" refers to the aromatic or benzenoid residue of the compound after the removal of the halogen atoms on the benzenoid nucleus.

From the foregoing, it is evident that preferred polyarylene polyether initiators are those wherein E is the residuum of a dinuclear dihydric phenol and E' is the residuum of a dinuclear benzenoid compound. These preferred initiators then are composed of recurring units having the formula

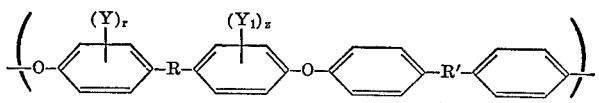

wherein R represents a member of the group consisting of a bond between aromatic carbon atoms and a divalent connecting radical and R' represents a member of the group consisting of sulfone, carbonyl, vinyl, sulfoxide, azo, saturated fluorocarbon, organic phosphine oxide and ethylidene groups and Y and $Y_1$ each represent inert substituent groups selected from the group consisting of halogen, alkyl groups having from 1 to 4 carbon atoms and alkoxy groups having from 1 to 4 carbon atoms and where $r$ and $z$ are integers having a value from 0 to 4 inclusive. Even more preferred are the polyarylene polyether initiators of the above formula wherein $r$ and $z$ are zero, R is a divalent connecting radical

wherein R'' represents a member of the group consisting of hydrogen, lower alkyl, lower aryl, and the halogen substituted groups thereof, and R' is a sulfone group.

A preferred class of the I initiators are those wherein the X—O— and —X' moieties are substituted in para positions on terminal aryl groups in E and E' respectively, or wherein the X and X' radicals contain aryl groups which have Hal, $SO_2Hal$, COHal, $SO_3R$, COOR, OCOOR,

NCO or $SO_2NCO$ groups in para substituent positions. such class of the I initiators are preferred since they usually provide for the fastest rates of polymerization.

The most preferred of the polyarylene polyether initiators of the present invention are compounds having the structure (II)

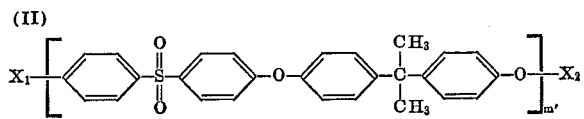

wherein $X_1$ is OH, Cl, or $OCH_3$,

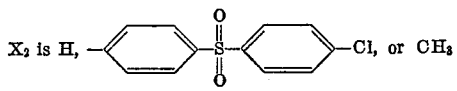

and $m'$ is an integer of about 5 to 100.

These II initiators are polymeric materials having molecular weights of about 2000 to 45,000 and they are commonly known as polysulfone resins. These II initiator materials are preferably prepared by reacting the sodium salt of bisphenol A with 4,4'-dichlorodiphenylsulfone. In such a reaction an excess of the latter compound is used to insure the presence of chlorine terminals, and an excess of the former compound is used to insure the presence of hydroxyl terminals after neutralization. The chlorine terminated materials provide substantially faster polymerization reactions than the hydroxyl terminated materials.

The preparation of the initiators having the I and II structures is more fully disclosed in U.S. 3,434,919; U.S. application No. 688,302 filed Dec. 6, 1967; and in U.K. 1,078,234. The I and II structure type initiators may also be prepared by oxidative coupling reactions as disclosed by A. S. Hay in Advances in Polymer Science, 4, 496 (1967); and by electrophilic substitution reactions as disclosed by J. I. Jones in J. Marcromol. Chem. C2, (2), 303 (1968).

THE BLOCK COPOLYMERS

The block copolymers of the present invention are block copolymers of the AB and ABA types, wherein A represents a block of lactam polymer and B represents the polyarylene polyether block. In the usual case these two types of block copolymers are concurrently prepared in the polymerization reaction. These two types of block copolymers may also be represented by the structures

III

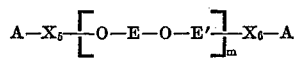

IV(a)

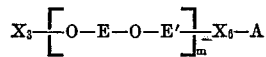

for the ABA copolymers and
and

IV(b)

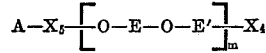

for the AB type block copolymer and wherein

A, E, E' and m are as defined above, and $X_3$ and $X_4$ are terminal groups such as X, X', $X_1$ and $X_2$ as defined above, $X_5$ and $X_6$ are residues of the reaction between the initiator terminals X and X', respectively, and the salt of the lactam being polymerized. For example, when X is ArHal and X' is Hal, then $X_5$ is Ar and $X_6$ is a chemical bond.

The A chains of lactam monomer attach to the initiator at the site of, and upon the removal during the initiating reaction of, all or part of one or both of the terminal groups.

Most of the above described X and X' terminal groups are active enough to serve as initiating sites, although with a given polymeric initiator not all of such individual X and X' sites will react. In the case where X is H, R or ArOR and X' is OH or OR these tereminal groups are not very reactive, per se. Where such groups are present it is believed that a scission of the chain of the polymeric initiator takes place, with the creation of a more active terminal group at the site of the cleaved polymer chain, as will be discussed further below.

A typical initiating reaction is believed to proceed in two steps as follows:

(1)

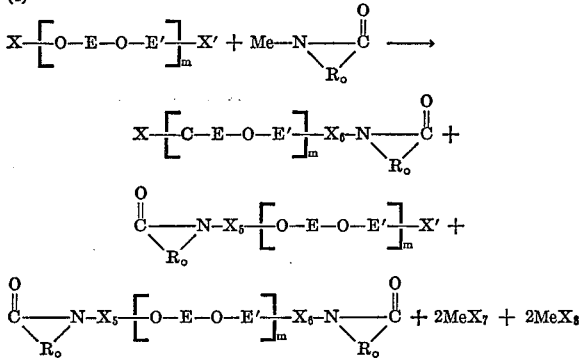

(2)

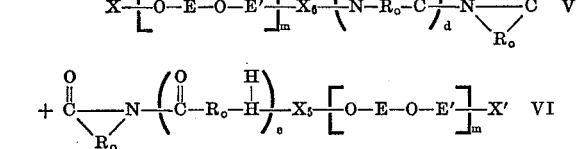

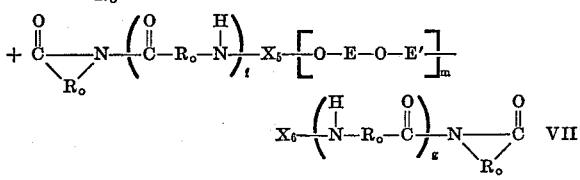

wherein V and VI represent AB type block copolymers, VII represents an ABA type copolymer, Me is the metal cation of the catalyst, $R_o$ is that portion of the lactam monomer polymerized which lies between the nitrogen atom and the carbonyl carbon atom of such lactam, E, E', d, e, f and g are as defined above, and where

| X or X' is— | $X_5$ or $X_6$ is— | And $X_7$ or $X_8$ is— |
|---|---|---|
| COHal | CO | Hal |
| COOR | CO | OR |
| —Ar-Hal | Ar | Hal |
| —Ar-OR | Ar | OR |
| —Ar-COHal | Ar-CO | Hal |
| —Ar-COOR | Ar-CO | OR |
| —Ar-OCOOR | Ar-OCO | OR |
| —Ar-SO$_2$Hal | Ar-SO$_2$ | Hal |
| —Ar-SO$_3$R | Ar-SO$_2$ | OR |
| —SO$_2$-Ar-Hal | SO$_2$-Ar | Hal |
| —Ar-CO-Ar-Hal | Ar-CO-Ar | Hal |
| —Ar-SO$_2$-Ar-Hal | Ar-SO$_2$-Ar | Hal |
| —Ar-SO$_2$-Ar-OR | Ar-SO$_2$-Ar | OR |
| —R'(COHal)$_2$ | —R'⟨CO CO | 2 Hal |
| —R'(COOR)$_2$ | —R'⟨CO CO | 2 OR |
| —R'''-COOR | —R'''-CO | OR |
| —R'''-COHal | —R'''-CO | Hal |
| —R'⟨CO/O\CO | —R'⟨CO\COO | |
| —R'''NCO | —R'''-NHCO | |
| —Ar-NCO | —Ar-NHCO | |
| —Ar-R'''-NCO | —Ar-R'''-NHCO | |
| —R'''-SO$_2$NCO | —R'''-SO$_2$NHCO | |
| —Ar-SO$_2$NCO | —Ar-SO$_2$NHCO | |
| —Ar-R'''-SO$_2$NCO | —Ar-R'''-SO$_2$NHCO | | and where

| X' is— | $X_6$ is— | And $X_8$ is— |
|---|---|---|
| Hal | Chemical bond | Hal |
| NCO | NHCO | |
| OCOHal | OCO | Hal |
| SO$_2$Hal | SO$_2$ | Hal |
| SO$_2$NCO | SO$_2$NHCO | |

It is believed that the above listed X and $X_1$ groups are the only terminal groups which will provide $X_5$ or $X_6$ moieties in the resulting polymers. In the cases where X and X' contains an NCO group, or is

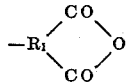

no $X_7$ or $X_8$ moiety splits off, but the entire $X_5$ or $X_6$ moiety is retained in the block copolymer, as noted above.

Under the polymerization conditions which are employed it is believed that chain scission takes place to some extent in all the

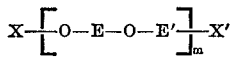

initators.

This scission reaction, moreover, as noted above, is believed to be the predominant source of initiating sites when the terminal groups are CH or OR, i.e. X and/or X' are H, R, —Ar—OH, —Ar—OR, OH, OR or —Ar—SO$_2$—Ar—OH particularly when high polymerization temperatures are used, i.e. ≥220° C., and/or when high catalyst concentrations are used, i.e., >2 mol percent of catalyst based on the moles of lactam monomer being polymerized. When such scission reactions occur they are believed to split the chain of the initiator between the E' and the adjoining O moieties therein, and the resulting terminals then become (VIII)
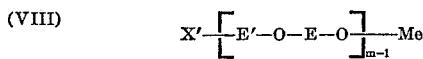

and (IX)
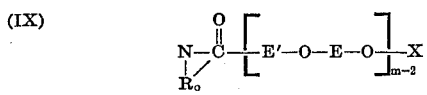

wherein $m_1 + m_2 = m$.

Species IX is chemically equivalent to those obtained from step (1) above when X' is Hal.

When a terminal group is R, i.e. when X is R, it is believed that the following initiating reaction may also take place

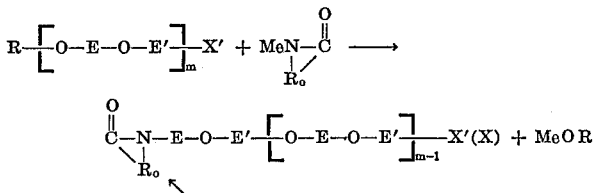

this is believed to be the resulting initiating site wherein

Thus, as a result of the scission reactions, it is believed that when X is H and X' is OH, there is no $X_5$ or $X_6$ group present in the resulting block copolymer. After the scission reaction, the initiating reaction continues as otherwise described above.

It can be seen, therefore, that a variety of initiators are provided for the preparation of lactam polymers all of which initiators are, basically, polyarylene polyether materials, properly terminated. The variation in the initiator species is thus readily obtained merely by changing the terminal group on the polyarylene polyether materials. It is thus possible to prepare block copolymers containing blocks of the lactam polymer and of the polyarylene polyether under various reaction conditions and in various type of reaction equipment. This concept is important because various types of equipment require different types of processing times and polymerization times. Some types of equipment require the use of slower or faster polymerization systems than do other types of equipment. Thus, the so-called "pot life" of the polymerization system is important in lactam polymerization technology. "Pot life" as the term is used herein means that period of time within which a polymerization system is workable, that is, remains in a shapeable consistency. In the polymerization of lactam monomers today it is a common practice to polymerize the monomer in situ, as in a casting or extrusion polymerization procedure wherein the end product is cast or extruded in an almost one-step operation, simultaneously with the polymerization of the lactam monomer. It is important, therefore, that the catalyst-initiator system used for these various types of polymerization procedures be capable of providing the necessary pot life so that the polymerization system can be used in such procedures. When used on a polyarylene polyether initiator of a given molecular weight, the following is a listing of the relative order of the activity of various types of terminal groups:

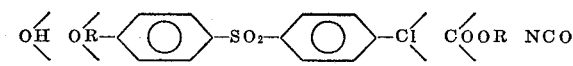

The following chart, moreover, provides an indication of the length of the pot life that might be obtained under different temperature conditions by the use of various of the terminal groups on a polyarylene polyether initiator having a molecular weight of about 5,000, using about 0.1 to 3 mol percent of such initiator and about 1 to 2 mol percent of sodium hydride as a catalyst with ε-caprolactam monomer.

| Pot life of polymerization systems | | | | |
|---|---|---|---|---|
| Terminal group | 150° C. | 200° C. | 220° C. | 250° C. |
| OH | 5 hrs | 0.5 hrs | 15 min | 4–5 min. |
| Cl | 45 min | 5 min | 2 min | 1 min. |
| COOR | 10 min | 2 min | 0.5 min | ≥0.25 min. |
| NCO | 1 min | 0.5 min | 0.25 min | ≥0.1 min. |

The preferred block copolymers of the present invention are those which contain about 20 to 80 weight percent of the lactam monomer in the form of block segments therein, and 80 to 20 weight percent of the polyarylene polyether materials as block segments therein.

THE CATALYST

The catalysts which may be employed in the anionic polymerization reaction of the present invention include all anionic catalyst materials which may be employed in the anionic polymerization of lactams. The catalyst material is usually a salt of the lactam being polymerized although any other lactam may be used to form the catalyst. The salt is usually prepared by reacting the lactam with a strong base, i.e., a base strong enough to convert the lactam to its salt. Such bases would include alkali and alkaline earth metals or basic derivatives of such metals such as the hydroxides, oxides, alkoxides, phenoxides, hydrides, alkyls, aryls, amides, borohydrides and weak acid salts, i.e., acetates, carbonates, bicarbonates, benzoates, sulfites and bisulfites; Grignard reagents, and various other organo-metallic compounds. Such bases would include, therefore, metals such as lithium, sodium, potassium, magnesium, calcium, strontium, barium, and aluminum and derivatives of such metals, such as lithium hydroxide, sodium hydroxide, potassium hydroxide, magnesium hydroxide, calcium hydroxide, strontium hydroxide, barium hydroxide, lithium hydride, sodium hydride, sodium oxide, sodium methoxide, sodium phenoxide, sodium methyl, sodium ethyl, sodium phenyl, sodium naphthyl, and sodamide; Grignard reagents such as ethyl magnesium chloride, methyl magnesium bromide, and phenyl magnesium bromide; and other compounds such as zinc diethyl, triisopropyl aluminum, diisobutyl aluminum hydride, and lithium aluminum hydride.

About 0.2 to 20, and preferably 0.5 to 4, mole percent of catalyst is used per mole of monomer being polymerized.

The catalyst and initiator are employed in a mole ratio to each other of about 2 to 200, and preferably, 3 to 10.

When the strong base is reacted with the lactam to form the catalyst a by-product is usually formed. For example, hydrogen is formed as a by-product when the metal hydrides or the elemental metals are used; water is formed as a by-product when metal hydroxides are used; alcohols are formed when alkoxides are used and water and $CO_2$ are formed when carbonate or bicarbonate salts are used. The preferred catalysts are those which result in the most readily removable by-products, since some of the by-products, such as $H_2O$, may have a deleterious effect on the polymerization reaction.

THE POLYMERIZATION PROCESS

The polymerization reaction is preferably conducted in bulk. Under such bulk polymerization procedures the polyarylene polyether initiator is preferably dissolved in the monomeric lactam. This can be accomplished easily at temperatures between 80° C. and 250° C. When initiators are used which contain less reactive end groups, i.e., hydroxyl or halogen

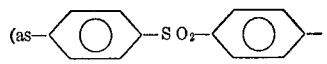

then the solution of initiator in lactam monomer may be stored in the liquid or molten state at temperatures which are slightly above the melting point of the monomeric lactam, i.e., about 70–75° C. for ε-caprolactam monomers, for up to about 40 hours without any appreciable change in the viscosity of the system or potency of the catalyst-initiator system. This provides an unusually long pot life for the molten system at such temperatures. The pot life is shorter at higher temperatures, i.e., between about 80° C. and 130° C. for ε-caprolactam, and at temperatures of about 130°–240° C. the ε-caprolactam polymerization reaction proceeds within a few minutes when using polymeric initiators having such OH and halogen terminals. The reactions will proceed even faster under such temperature conditions when other terminal groups are used on the initiator. The bulk polymerization reaction is usually conducted at atmospheric pressure and at a temperature of about 130 to 260° C. The reaction can be conducted at a temperature which is above or below the melting point of the resulting polymer, and above that of the monomer. The use of elevated pressure is not required for the polymerization reaction. The bulk polymerization reaction requires a polymerization period of about 3 to 15 minutes at 130°–200° C. depending on the lactam(s) employed, the catalyst concentration, and the polymerization temperature. The bulk polymerization reaction should be carried out under anhydrous conditions, i.e., in the presence of no more than about 0.2 weight percent, and preferably no more than 0.03 weight percent, of water or other active hydrogen containing by-product. Where a catalyst is used which would generate water or other active hydrogen containing by-products, such as the hydroxide, alkoxide or phenoxide catalysts, the excess amounts of such by-product materials should be removed before the polymerization reaction is conducted.

The polymerization is preferably carried out under an inert blanket of gas, such as, nitrogen, argon or helium in order to prevent oxidative degradation of the monomer and of destruction of the catalyst by moisture.

The reaction may be carried out batchwise or continuously. An advantageous method of carrying out the reaction of the present invention is to conduct the bulk polymerization in conventional molding equipment such as a rotational casting device or a compression molding machine, or an extruder. In this way the polymer and the molded objects can both be formed in one step. Where the polymerization is conducted in such molding devices, conventional molding pressures may be employed in order to simultaneously form the molded object with the in situ formed polymer.

Since the lactams are normally solid materials at room temperatures, the bulk polymerization reactions may be carried out by various procedures. In one procedure, the lactam may be melted, and both the catalyst and the initiator admixed with it and then the reaction may be caused to proceed by bringing the reaction mixture to polymerization temperatures.

In another procedure, the catalyst and initiator may be dissolved separately in the lactam monomer, after which the two separate solutions may be combined to cause the polymerization to proceed at polymerization temperatures. Where the polymerization is conducted in molding equipment, the equipment may be heated to the desired polymerization temperature in order to effect polymerization upon injection therein of the polymerization reaction system.

In addition to being conducted in bulk, the polymerization may also be conducted in high boiling inert organic solvents, i.e., those having boiling points of above 100° C., such as chlorobenzene, dichlorobenzene, xylene, trichlorobenzene, dimethyl sulfoxide, N-alkyl pyrrolidones and hexamethylphosphoramide at temperatures of about 100° C. up to the boiling point of the solvent; or at temperatures of about 130 to 240° C. in dispersion systems such as those disclosed in U.S. 3,061,592 and 3,383,352, and by G. B. Gechele and G. F. Martins in J. Applied Polymer Science, 9, 2939 (1965).

The following examples are merely illustrative of the present invention and are not intended as a limitation upon the scope thereof.

The properties of the polymers produced in the examples were determined by the following test procedures:

| Property | Test procedure |
| --- | --- |
| Tensile strength, p.s.i. | ASTM D-638. |
| Tensile modulus, p.s.i. | ASTM D-638. |
| Yield strength, p.s.i. | ASTM D-638. |
| Yield elongation, percent. | ASTM D-638. |
| Tensile elongation, percent. | ASTM D-638. |
| Elongation at break, percent. | ASTM D-638. |
| Notched Izod impact, ft. lbs./in. of notch. | ASTM D-256-56. |
| Heat distortion temperature, °C. | ASTM D-648-56. |
| Melt flow temperature, °C. | ASTM D-1238-52T. |
| $T_g$, °C. | Tex. Res. J., 1955. |
| Tensile impact, ft. lbs./in.$^3$. | ASTM D-1822-61T. |

Reduced viscosity

Reduced viscosity (R.V.) were measured in m-cresol at 25° C. for the nylon polymers and the block copolymers and in $CH_3Cl$ at 25° C. for the polysulfone polymers. The time taken for the polymer solution to flow in an Ostwald viscometer was compared with the time taken for the pure solvent. The R.V. was calculated from the equation:

$$R.V. = (S.T. - B.T.)/B.T. \qquad (1/C)$$

where S.T. is sample time (in seconds), B.T. is blank time (in seconds) and C is concentration in grams/deciliter. The units of the R.V. values are then deciliters/gram.

Pendulum impact

Thin film specimens (⅛ inch wide and shear cut from a film of the polymer) were used to measure impact properties. The impact characteristics of the films were determined on a modified Baldwin impact tester. A ¼ in. diameter rod was used as the impacting head of the pendulum. A 1 by ⅛ in. film sample was mounted transverse to the path of the pendulum and located at the bottom of the swing. The ¼ in. rod struck the ⅛ in. face of the sample half way between the ends. The energy to break the sample was determined by the difference between the initial height and the recovery height of the pendulum after it had broken the sample.

$$\text{pendulum impact, ft. lb/in.}^3 = \frac{\text{Pendulum energy loss}}{\text{Volume of sample}}$$

Glass transition temperature

The glass transition temperature was determined on thin film samples by measuring the recovery characteristics as a function of temperature. A film specimen was strained 1% at the rate of 10%/min. and then allowed to return at the same rate. The recovery or resilience was calculated from the ratio of the recovered length to original length. This test was repeated at elevated temperatures. A programmed rate of heating of 1.5–2° C./min. was used, measurements being repeated at intervals of 3–5° C. The glass transition temperature $T_g$ is defined as the minimum in a plot of resilience versus temperature.

$T_m$, or melting point

This is the temperature that can be determined from the modulus-temperature curves and at which the tensile modulus has a value of 100 p.s.i. This temperature is often referred to as $T_2$ instead of $T_m$.

EXAMPLE I

Synthesis of chlorine terminated polysulfone

To a five liter, four neck Morton flask fitted with dropping funnel, thermometer, argon inlet, mechanical stirrer, water separator and condenser were added 343.0 grams, 1.50 moles) of bisphenol-A, 2000 ml. of chlorobenzene and 1000 ml. of dimethylsulfoxide. After the solution became homogeneous and was well purged with argon, 122.8 grams of 97.9% sodium hydroxide (3.0 moles) was added as a 50% freshly made solution in boiled, distilled water. An anhydrous solution of the bisphenol-A sodium salt in a predominantly dimethyl sulfoxide media was obtained by azeotropic distillation of the chlorobenzene and water. After 2½ hours of distillation, the pot temperature had reached 153° C. and a clear, amber and somewhat viscous solution was obtained. At this point 448.28 grams of 4,4'-dichlorodiphenylsulfone (1.5626 mole) (a 4 mole percent excess) was added as a hot 50% solution in dry chlorobenzene. The 4,4'-dichlorodiphenylsulfone was added over an eight minute period so that the chlorobenzene could distill without lowering the pot temperature below 150° C. The polycondensation reaction started immediately as evidenced by a change in color from amber to golden yellow. The reaction temperature was adjusted to 160° C. and, within 30 minutes, the solution viscosity was much higher. After 1½ hours at 160° C. the viscosity was only slightly more higher but the solution color was now a greenish-yellow. This color is typical for the polysulfone polymer prepared with excess 4,4'-dichlorodiphenylsulfone. After a total reaction time of two hours and 20 minutes, the heating mantle was removed and while the system was cooling, 1000 ml. of chlorobenzene was added to reduce the solution viscosity. The cooled polymer solution was filtered through Celite diatomaceous earth then coagulated in methanol. The precipitated polymer was washed twice with methanol and once with water in a Waring Blender. The white polymer was vacuum dried at 100° C. for 24 hours and 125° C. for 4 hours. The yield was 620 grams (94%) and the R.V. (0.2 in $CHCl_3$ at 25° C.) was 0.318 dl./gm. The latter value suggested a molecular weight ($\overline{Mn}$) of around 12,000 gm./mole. The chlorine analysis on polymer redried 4 hours at 130° C. under vacuum was 0.53±0.1% (duplicate determinations) which agrees well with that which would be expected for a $\overline{Mn}$ of 12,000 (0.59%).

EXAMPLE II

Synthesis of higher molecular weight chlorine terminated polysulfone

Chlorine terminated polysulfone of higher molecular weight (R.V.=0.55 dl./gm., 0.2% $CHCl_3$ at 25° C.) than that prepared in Example I was prepared as in Example I. The one important difference being that 1½ mole percent excess of 4,4'-dichlorodiphenylsulfone was employed rather than 4 mole percent. The R.V. value of the polymer produced in this example is equal to a $\overline{Mn}$ of 25–30,000 g./mole. This polymer, when molded at 250° C., gave an exceptionally water white transparent plaque.

EXAMPLE III

Preparation of a block polymer containing 75% weight of poly(ε-caprolactam)

To a dry, 500 ml., 3 neck flask fitted with a mechanical stirrer, argon inlet-tube, a 3-way Teflon stopclock attached to a condenser, and a graduated receiver, were added 56.6 gms. (4.72×10⁻³ moles) of the chlorine-terminated oligomer produced in Example I, 100 ml. of chlorobenzene, and 220 ml. of freshly distilled ε-caprolactam (1.95 moles=220 gms.). Stirring and circulation of dry argon were started. The solution was heated (oil-bath) and 95% of the chlorobenzene was distilled off (time of distillation: 1.5 hours). A substantially dry solution of the oligomer in the lactam was left in the flask as the residue.

In a separate, dry 100 ml. flask fitted with a magnetic stirrer, thermometer, an argon-inlet tube, and a condenser were placed 30 ml. of distilled ε-caprolactam. Heating of this material was accomplished via a heating mantle. The temperature of the molten lactam was kept at 130° C., dry argon was circulated over its surface, and 0.4 gms. (0.8 gm. of a 50–50 by weight dispersion in mineral oil) of NaH (1.67×10⁻² moles) was added to it. Rapid (~10 min. total time) evolution of hydrogen took place and yielded a clear solution of the catalyst.

Twenty-nine and one half milliliters of this catalyst solution ($1.64 \times 10^{-2}$ moles) were now transferred via syringe to the oligomer solution in ε-caprolactam. The oil-bath temperature was kept at 175° C. A rapid increase in viscosity was observed and at the end of a 23 minute period the mixture was solid. Heating was continued for another 9 minutes at which time the reaction was considered complete. The resulting block copolymer product was cooled under argon. The cold copolymer product recovered from the flask, after breaking it up, was highly crystalline and tough. A mechanical saw and a mechanical grinder were used in order to break the material into small particles. The yield of this crude product was quantitative. Its R.V. (0.1 gm./100 ml. m-cresol, 25° C.) was 2.53 dl./gm. A tough, flexible film was compression molded from this block copolymer at 250° C.

Physical properties of this film were:

Tensile strength—9,000 p.s.i.
Tensile modulus—67,000 p.s.i.
Elongation at break—360%
Pendulum impact—>360 ft. lbs./in.$^3$
$T_g$—50° C.
$T_2$ ($T_m$)—205° C.

The environmental stress-crack resistance of this block copolymer was excellent. The copolymer withstood a stress of 3,000 p.s.i. in acetone, ethyl acetate, mixtures of toluene/heptane, locktite, and trichloroethylene with no deterioration of mechanical properties after periods of ≥10 minutes. Polysulfone deteriorates in these media at stresses of ≤500 p.s.i.

The crude material was now extracted with ~2 liters of 0.5% formic acid at 60° C. for 2 hours. After filtration the precipitate was washed twice for 5 minutes with 2 liters of distilled water. The product was filtered and dried at 100° C. under 40–50 mm. vacuum for 16 hours.

The washed material was submitted to a soxhlet extraction with chloroform for 20 hours. Chloroform is a good solvent for polysulfone but does not dissolve the block copolymer. The extracted material was vacuum dried till constant weight at 100° C. The yield of chloroform-insoluble block copolymer was 90.2%. The R.V. (0.1 g./100 ml.; m-cresol, 25° C.) of the copolymer was 3.5 dl./gm. Elemental analysis gave 9.7% N and 1.45% S which corresponds to 78% wt. of nylon 6 in the block copolymer. Tough films possessing excellent environmental stress crack resistance properties comparable to such properties as were described above for the crude material were obtained on compression-molding at 250° C.

Physical properties of compression molded film made from the purified block copolymer were:

R.V. (0.1 g./100 ml., m-cresol at 25° C.)—2.59 dl./gm.
Tensile modulus—220,000 p.s.i.
Tensile strength—8,000 p.s.i.
Elongation at break—90–200%
Pendulum impact—132 ft. lbs./in.$^3$
$T_g$—50° C.
$T_2$ ($T_m$)—205° C.
Estimated heat distortion temperature—55° C.

The observed difference in the tensile moduli between the crude and extracted materials is due to the removal of plasticizing impurities (solvent, monomer, lactam, unreacted oligomer). The solubilities are given:

Polysulfone is soluble in: chlorinated aliphatics, chlorinated aromatics, etc. The copolymer is insoluble in almost all common solvents, except such powerful solvents as m-cresol, o-chlorophenol and α-naphthol, etc. The high crystallinity of the nylon 6 segments in the copolymer is responsible for the low solubility and excellent environmental stress-crack resistance characteristics of the block copolymer.

EXAMPLE IV

A poly(ε-caprolactam)polysulfone block copolymer was prepared for use in the alloys of the present invention. For this preparation 11,000 grams of ε-caprolactam, 2,000 milliliters of chlorobenzene, and 2,365 grams of a polysulfone polymer were heated at 150° C., until the polysulfone polymer was dissolved. The polysulfone material was a chlorine terminated polysulfone having a molecular weight of about 30,000. This polysulfone material had a reduced viscosity of 0.5 deciliters per gram (at a concentration of 0.2% in CHCl$_3$ at 25° C.).

After the polysulfone had completely dissolved the temperature of the resulting solution was raised to about 210° C. in order to devolatize the chlorobenzene from the system. After this, about 4,000 milliliters of the resulting solution were transferred to a 5 liter stirred feed pot reactor connected to a vented extruder.

There was separately prepared a catalyst solution which was prepared by the addition of sodium hydride (as a 0.57% by weight dispersion in mineral oil) to molten ε-caprolactam held at a temperature of 110–120° C., so as to provide sufficient Na caprolactam catalyst solution as to correspond to 0.8 mol percent of the ε-caprolactam in the feed pot reactor. This catalyst solution was then pumped to the polysulfone/ε-caprolactam solution and the entire polymerization system was held in the feed pot reactor at about 90° C. prior to being fed to an extruder where it was subjected to polymerization temperatures.

The extruder used was a one inch single screw extruder having a length to diameter ratio of 36 and a screw speed of 250 revolutions per minute. The temperature of the vents were 250° C. and 270° C. Each vent was connected to a vacuum pump operated at about 1 mm. Hg. The unreacted lactam was removed through the vents. The extruder had seven temperature zones, which had the following temperature profile:

| Zone temp., ° C. | Zone | | | | | | |
|---|---|---|---|---|---|---|---|
| | 1 | 2 | 3 | 4 | 5 | 6 | 7 |
| Set | 100 | 240 | 250 | 250 | 255 | 260 | 240 |
| Actual | 145 | 240 | 250 | 250 | 255 | 270 | 250 |

The vents were located at zones 3 and 6.

The initial rate at which the resulting polymer product was removed from the extruder, which was at the end of zone 7, was 1600 grams per hour. This rate was increased to 2,200 grams per hour within the first two hours of the run and for the remainder of the run. The total length of the run was 24 hours and the product appeared uniform from the beginning to the end of the run. Approximately 100 pounds of the block copolymer containing 77 weight percent of nylon-6 and 23 weight percent of polysulfone was obtained, wherein the A blocks were nylon-6 blocks and the B blocks were polysulfone blocks.

The copolymer thus produced had a weight average molecular weight of approximately 100,000 grams/mole. It had a reduced viscosity, at a 0.1 weight percent concentration in m-cresol at 25° C., of 1.8 deciliters/gram.

The conversion of ε-caprolactam monomer to nylon blocks in the resulting block copolymer was 90% as determined by methanol extraction of the block copolymer (24 hours in boiling methanol).

EXAMPLES V AND VI

Various polymers were used in preparing various alloys and other compositions to illustrate the present invention. The polymers used in these examples were the following:

Nylon polymers

Nylon A.—Nylon 6 homopolymer having a melt index of 11 and a reduced viscosity of 1.5 in m-cresol at 0.1 gm./dl. concentration.

Nylon B.—Nylon 6 homopolymer stabilized with about 0.5 weight percent of a thermal stabilizer and a reduced viscosity of 1.5 in m-cresol at 0.1 gm./dl. concentration.

Polyarylene polyethers

Polysulfone A.—Polysulfone resin having a glass transition temperature of 185° C., a melt index of 5–8 and an R.V. of 0.50 dl./gm. (0.2 gm./100 cc. in chloroform at 25° C.).

Polysulfone B.—Polysulfone resin having a glass transition temperature of 185° C., a melt index of 1, and an R.V. of 0.68 dl./gm. (0.2 gm./100 cc.) in chloroform at 25° C.).

Polysulfone C.—Polysulfone resin having a glass transition temperature of 185° C., a melt index of 3, and an R.V. of 0.58 dl./gm. (0.2 gm./100 cc. in chloroform at 25° C.).

Polysulfone D.—Polysulfone resin having a glass transition temperature of 180° C., a melt index of 17, and an R.V. of 0.4 dl./gm. (0.2 gm./100 cc. in chloroform at 25° C.).

Block copolymers

Block Copolymer A.—A block copolymer prepared as in Example IV above, and containing 77 weight percent of nylon-6 blocks and 23 weight percent of polyarylene polyether blocks, and having an R.V. of 1.8 dl./gm. (0.1 gm./100 cc. in m-cresol at 25° C.).

Block Copolymer B.—A block copolymer prepared as in Example III above, and containing 75 weight percent of nylon-6 blocks and 25 weight percent of polyarylene polyether blocks, and having an R.V. of 2.53 dl./gm.

EXAMPLE V

Alloys and blends of various materials were prepared using Block Copolymer A and some of the other described polymers. These alloys and blends were prepared by blending the various components thereof in a two vent, one inch single screw extruder with the first vent operating at 260–265° C., and the second vent at 270–275° C., with both vents connected to vacuum pumps operating in the range of 1 mm. Hg. Volatile materials such as residual water and monomeric lactam were thus removed through the vents. The blends of materials thus prepared are listed below in Table I as Blends A to E, representing alloys of the present invention.

Table I also lists the total weight percent of the nylon and polyarylene polyether components in the resulting blends. The nylon components are present in the blends as Nylon Polymer A and/or as nylon-6 blocks in Block Copolymer A, and the polyarylene polyether components are present in the blends as Polysulfone A, Polysulfone D, and/or polyarylene polyether blocks in Block Copolymer A.

TABLE I

| Blend | Polymer component weight percent | | | | Total weight percent in composition of— | |
|---|---|---|---|---|---|---|
| | Block copolymer A | Nylon A | Polysulfone A | Polysulfone D | Nylon components | Polyarylene polyether components |
| A | 50 | 50 | 0 | 0 | 88.5 | 11.5 |
| B | 79.5 | 0 | 20.5 | 0 | 60 | 40 |
| C | 67.7 | 0 | 32.3 | 0 | 50 | 50 |
| D | 47.6 | 0 | 52.4 | 0 | 35 | 65 |
| E | 47.6 | 0 | 0 | 52.4 | 35 | 65 |

Various of the properties of these blends were evaluated for various mechanical properties, chemical resistance properties and environmental stress aging characteristics.

When attempts were made to form useful blends of Nylon A or Nylon B with Polysulfones A to D containing about 35 to 90 weight percent of nylon components and about 10 to 65 weight percent of polyarylene polyether components the resulting blends were found to be too brittle to be useful. Molded specimens of such blends had less than 5% tensile elongation.

The mechanical properties of the blends that were evaluated are listed below in Table II. The mechanical properties were measured on injection molded samples of the tested blends. The injection molding was conducted at 275° C. to produce test specimens shaped in accordance with the requirements of the ASTM procedure being used. Before being evaluated for the reported mechanical property values, some of the test specimens were aged for one week at 50% relative humidity and at 25° C., and some of the test samples were aged for two months at 50% relative humidity and at 25° C. The remaining samples were evaluated with in 48 hours after they were injection molded.

For comparison purposes Table II also lists the comparable mechanical properties of Nylon Polymer A, which contains, of course, 100 weight percent of nylon components.

The results listed in Table II show that the heat distortion temperature of the alloys of the present invention, which contain relatively large amounts of nylon components, can be raised considerably above that of nylon-6 without any significant deterioration in the reported mechanical properties for such alloys.

TABLE II.—MECHANICAL PROPERTY RESULTS FOR TENSILE IMPACT COMPOSITIONS
Tested after injection molding (dry)

| Sample | Nylon-6, percent | Tensile | | Notched Izod, ft.-lb./in. of notch | Percent elongation | Tensile impact, ft.-lb./in.³ | HDT, ° C. (264 p.s.i.) ° C. |
|---|---|---|---|---|---|---|---|
| | | Modulus (p.s.i.) | Strength (p.s.i.) | | | | |
| Nylon A [1] | 100 | 391,000 | 9,940 | 1.5 | 25 | 371 | 64 |
| Blend: | | | | | | | |
| A [1] | 88.5 | 407,000 | 10,800 | 1.3 | 190 | 383 | 60 |
| B [1] | 60 | 375,000 | 9,970 | 1.1 | 170 | 428 | 78 |
| C [1] | 50 | 393,000 | 10,800 | 1.2 | 161 | 392 | 120 |
| D [1] | 35 | 398,000 | 10,900 | 1.1 | 152 | 390 | 143 |
| E [1] | 35 | 374,000 | 10,000 | 1.1 | 147 | 428 | 136–151 |
| Tested after 2 months at 50% R.H. | | | | | | | |
| Nylon A | 100 | 239,000 | 8,810 | 1.5 | 177 | | 53 |
| Blend: | | | | | | | |
| A | 88.5 | 298,000 | 10,700 | 1.2 | 266 | | 5 |
| C | 50 | 246,000 | 9,210 | 1.4 | 177 | | 110–115 |
| D | 35 | 286,000 | 9,200 | 1.3 | 153 | | 133 |

[1] One week at 50% R.H.

Although the alloys of the present invention do have relatively high heat distortion temperatures, which approach that of the polyarylene polyethers (i.e., up to 170° C.) they can be injection molded at much lower temperatures that are commonly employed with the polyarylene polyethers, i.e., ~350° C. Table III below lists the molding conditions used, and mechanical properties of the resulting products when Blend D above, which had a HDT of 143–151° C., as noted in Table II, was injection molded at temperatures ranging from 275 to 300° C. The test specimens used for the evaluations reported in Table III were tested after first being aged for 17 days at 50% relative humidity at 25° C. The test results show that the alloy could be molded over a wide range of molding temperatures without undergoing any significant loss of physical properties.

TABLE V.—CHEMICAL RESISTANCE PROPERTIES

| Solvent | | Percent weight gain | |
|---|---|---|---|
| | Polysulfone A | Blend D | Nylon A |
| Trichloroethylene | Swells and forms gel | 11.6 | .43 |
| Chlorobenzene | Dissolves | 9.3 | .11 |
| Acetone | Swells and forms gel | 1.8 | .33 |
| Ethanol | .20 | 2.0 | 8.5 |
| Benzene | Swells and forms gel | 1.1 | .30 |
| Heptane | .12 | .16 | .18 |

Table VI below lists the results of several chemical resistance evaluation tests conducted in various acid and

TABLE III.—INJECTION MOLDING TRIAL RESULTS ON BLEND D

| Stock temperature (° F.) | | Mold temp. (° F.) | Fill time (sec.) | Pressure (p.s.i.) | Tensile | | Elongation at break percent | Notched Izod, ft.-lb./ in. of notch | Tensile impact, ft.-lb./in.³ |
|---|---|---|---|---|---|---|---|---|---|
| Set | Actual | | | | Modulus (p.s.i.) | Strength (p.s.i.) | | | |
| 450 | 540 | 130 | 3 | 2,000 | 334,000 | 9,170 | 142 | 1.0 | 403 |
| 450 | 540 | 130 | 1 | 2,000 | 329,000 | 8,860 | 137 | 1.0 | 390 |
| 450 | 540 | 130 | 6 | 2,000 | 334,000 | 8,970 | 133 | .9 | 446 |
| 500 | 580 | 130 | 3 | 2,000 | 339,000 | 9,210 | 138 | 1.0 | 356 |
| 500 | 580 | 130 | 1 | 2,000 | 332,000 | 8,460 | 62 | 1.0 | 391 |
| 500 | 580 | 130 | 6 | 2,000 | 332,000 | 8,640 | 110 | 1.0 | 380 |
| 550 | 610 | 140 | 3 | 2,000 | 340,000 | 9,190 | 142 | 1.0 | 404 |
| 550 | 610 | 160 | 1 | 2,000 | 345,000 | 8,960 | 124 | .9 | 379 |
| 550 | 610 | 160 | 6 | 2,000 | 339,000 | 9,130 | 66 | 1.0 | 444 |
| 600 | 650 | 160 | 3 | 2,000 | 341,000 | 8,910 | 22 | 1.0 | 413 |
| 450 | 540 | 210 | 3 | 2,000 | 327,000 | 9,270 | 149 | 1.0 | 427 |
| 450 | 540 | 210 | 1 | 2,000 | 331,000 | 8,980 | 60 | 1.0 | 416 |
| 450 | 540 | 210 | 6 | 2,000 | 340,000 | 9,580 | 122 | 1.2 | 421 |
| 500 | 580 | 210 | 3 | 2,000 | 337,000 | 9,500 | 109 | 1.3 | 455 |
| 500 | 580 | 210 | 1 | 2,000 | 334,000 | 9,490 | 88 | 1.3 | 414 |
| 500 | 580 | 210 | 6 | 2,000 | 331,000 | 9,480 | 156 | 1.2 | 461 |
| 500 | 580 | 210 | 3 | 750 | 335,000 | 9,780 | 163 | 1.1 | 430 |
| 550 | 610 | 210 | 3 | 2,000 | 328,000 | 8,840 | 100 | 1.2 | 428 |
| 550 | 610 | 210 | 1 | 2,000 | 322,000 | 8,890 | 59 | 1.2 | 442 |
| 500 | 580 | 200 | 3 | 2,000 | 346,000 | 9,280 | 86 | 1.3 | 450 |

Table IV below lists various mechanical properties of injection molded (at 275° C.) samples of Nylon A, Blend C and Blend D when the samples were tested over a range of temperature from —40° F. to 212° F. The samples were not aged after being injection molded, and prior to their being tested. The tests results reported in Table IV show that alloys of the present invention tend to retain more of their mechanical properties over a wider range of temperature than do the nylon homopolymers.

TABLE IV.—TEMPERATURE PROPERTY PROFILE

| Composition | Temperature, ° F. | Tensile | | Elongation at break, percent | Notched Izod, ft.-lb./in. of notch |
|---|---|---|---|---|---|
| | | Modulus (p.s.i.) | Strength (p.s.i.) | | |
| Nylon A | —40 | 537,000 | 14,500 | 18 | .4 |
| | 0 | 463,000 | 11,500 | 18 | 1.0 |
| | 32 | 380,000 | 9,300 | 30 | 1.4 |
| | 72 | 239,000 | 8,180 | 177 | 1.5 |
| | 100 | 125,000 | 7,020 | 178 | 5.2 |
| | 212 | 59,000 | 4,950 | 195 | |
| Blend C | —40 | 517,000 | 14,900 | 13 | .5 |
| | 0 | 495,000 | 13,000 | 57 | 1.0 |
| | 32 | 425,000 | 10,200 | 123 | 1.1 |
| | 72 | 246,000 | 9,210 | 177 | 1.4 |
| | 100 | 172,000 | 7,888 | 189 | 2.4 |
| | 212 | 118,000 | 6,070 | 222 | |
| Blend D | —40 | 497,000 | 14,700 | 54 | 1.0 |
| | 0 | 452,000 | 12,500 | 138 | 1.1 |
| | 32 | 426,000 | 10,200 | 99 | 1.2 |
| | 72 | 286,000 | 9,200 | 153 | 1.3 |
| | 100 | 228,000 | 7,780 | 153 | 1.9 |
| | 212 | 172,000 | 5,820 | 162 | |

Table V below lists the results of several chemical resistance evaluation tests conducted in various organic solvents. The materials evaluated were Polysulfone A, Nylon A and Blend D. These materials were evaluated in the form of injection molded (at 275° C.) bars measuring ⅛" x ½" x 5". The test samples were immersed in the listed solvents for 18 days at 25° C. the test results list the percent weight gain experienced by the various test samples during the test period. These results indicate that the alloys of the present invention have good solvent resistance properties even with relatively low nylon contents.

base media. The materials evaluated were Nylon A, Blend C and Blend D. These materials were evaluated in the form of injection molded bars measuring ⅛" x ½" x 5". The test samples were immersed in the listed acid and base media for 1 week at 25° C. The test results list the changes, in percent, in the weight and dimensions experienced by the test samples during the test period. These results indicate that the alloys of the present invention have improved resistance to acid and base media as compared to the corresponding properties of nylon homopolymers.

TABLE VI.—CHEMICAL RESISTANCE PROPERTIES
[Acid and base immersion results]

| Sample | Environment | Percent | | | |
|---|---|---|---|---|---|
| | | Weight change | Length change | Width change | Thickness change |
| Nylon A | 3% H₂SO₄ | 3.81 | .49 | .66 | 2.4 |
| | 10% HCl | 7.65 | .59 | 1.00 | 4.9 |
| | 10% NaOH | 1.87 | .40 | .49 | 1.4 |
| Blend C | 3% H₂SO₄ | 2.14 | .39 | .47 | 2.5 |
| | 10% HCl | 3.98 | .49 | .56 | 2.2 |
| | 10% NaOH | 1.09 | .20 | .20 | .53 |
| Blend D | 3% H₂SO₄ | 1.44 | .22 | .23 | .79 |
| | 10% HC | 2.34 | .28 | .30 | .79 |
| | 10% NaOH | .84 | .23 | .20 | .00 |

One of the basic deficiencies of polysulfone resins, as well as other amorphous thermoplastics, is the catastrophic decline in mechanical properties when exposed to organic chemical environment. This is encountered in end use applications which may require cleaning operations using solvents such as xylene, trichloroethylene, and acetone, or other aromatic, ketone or ester solvents. The problem also arises with long term exposure to adverse environments such as detergents and sealants. Internal stresses resulting from a molding operation or external stresses applied to polysulfone resins in these adverse environments results in stress cracking and rupture. Stress cracking or crazing generally results in organic environments for a polymer which adsorbs a large amount of a solvent. This produces swelling at the surface, and under a tensile stress, the interior of the specimen is under tension while the surface is under compression. This problem is quite severe for amorphous thermoplastics such as polymethylmethacrylate, polystyrene, bisphenol A polycarbonate, PPO, polysulfone, and Phenoxy A.

Several approaches have been attempted to improve the environmental stress aging (ESA) characteristics of polysulfone resins. These include crosslinking and blending with other polymers. Crosslinking, however, results in a non-processible material and thus does not allow a practical solution. ABS resin and impact grade polymethylmethacrylate blends with polysulfone resins tend to provide improvements in the ESA characteristics of the polysulfone resins but the chemical resistance of the polysulfone resins is not thereby improved.

The polysulfone/nylon-6 block copolymers, however, dramatically improve the ESA characteristics and the chemical resistance of polysulfone resins when the nylon-6 concentration is >30 weight percent in the alloys.

Table VII below lists the results of several environmental stress aging studies that were conducted in three organic solvents: trichloroethylene, acetone and xylene. For comparative purposes, the ESA properties of Blend D were compared with the ESA properties of various resins, i.e., Polysulfone A; a polyarylene ether resin having a R.V. of 0.5 dl./gm. (as a 0.2 gm./100 cc. solution in $CHCl_3$ at 25° C.); a bisphenol A polycarbonate resin having a R.V. of 0.4 to 0.5 dl./gm. (as a 2 gm./100 cc. solution in $CHCl_3$ at 25° C.); a blend of polyphenylene oxide (PPO) and impact grade polystyrene (PS); and a blend of acrylonitrile-butadiene-styrene resin (ABS) and Polysulfone A.

resulting alloys were then sheeted and refluxed several times to insure good mixing before the alloy was finally removed from the mill. The total weight of each of the alloys that were prepared was 60.0 grams. Table VIII below lists the alloys thus prepared as Blends H to M, with Blends H to K representing alloys of the present invention. Blends L and M represent attempts to form useful alloys from Nylon A and Polysulfone A. The attempts at forming useful blends from Blends L and M were unsuccessful because the blended compositions were usually too brittle, even to be successfully tested. Where the samples could be tested the mechanical properties of such blends were always poor. Table VIII also lists the total weight percent of the nylon and polyarylene polyether components in the resulting alloys. The nylon components are present in the blends as nylon blocks in Block Copolymer B, and the polyarylene polyether components are present in the blends in the form of Polysulfone A and polyarylene polyether blocks in Block Copolymer B.

TABLE VIII

| Blend: | Polymer component, weight percent | | | Total weight percent in blend of— | |
|---|---|---|---|---|---|
| | Block copolymer B | Polysulfone A | Nylon A | Nylon components | Polyarylene polyether components |
| H | 10 | 90 | 0 | 7.5 | 92.5 |
| I | 20 | 80 | 0 | 15.0 | 85.0 |
| J | 40 | 60 | 0 | 30.0 | 70.0 |
| K | 53 | 47 | 0 | 40.0 | 60.0 |
| L | 0 | 80 | 20 | 20 | 80 |
| M | 0 | 60 | 40 | 40 | 60 |

TABLE VII.—ENVIRONMENTAL STRESS AGING RESULTS

| Polymer | Trichloroethylene | Acetone | Xylene |
|---|---|---|---|
| Polysulfone-A | 200 p.s.i. imm. ruptured | 200 p.s.i. imm. ruptured | 200 p.s.i. 1 min. rupture. |
| Polyarylene ether | 200 p.s.i. 10 min. NCB | do | 200 p.s.i. ½ min. rupture. |
| Bisphenol A-polycarbonate | 500 p.s.i. 10 min. rupture | | |
| PPO/PS | {500 p.s.i. 10 min. NCB; 1,000 p.s.i. 6 min. rupture (tacky). | 200 p.s.i. 10 min. NCNB; 500 p.s.i. 1 min. rupture | 200 p.s.i. 10 min. NCNB. 500 p.s.i. 10 min. NCB. |
| ABS/polysulfone A | {500 p.s.i. 10 min. NCB; 1,000 p.s.i. 5 min. rupture | 500 p.s.i. 10 min. NCB; 1,000 p.s.i. 4 min. rupture (tacky) | 200 p.s.i. 1 min. rupture. |
| Blend D | {2,000 p.s.i. 10 min. NCNB; 3,000 p.s.i. 10 min. NCB | 2,000 p.s.i. 10 min. NCNB | 2,000 p.s.i. 10 min. NCNB. 3,000 p.s.i. 2 min. rupture. |

Key: NCNB=not crazed, not brittle; NCB=not crazed, brittle.

EXAMPLE VI

Alloys and blends of various materials were prepared using Block Copolymer B and some of the other of the above described polymers. These alloys and blends were prepared by blending the various components thereof on a two roll mill heated electrically to about 240° C. In forming each of the desired alloys, Block Copolymer B was added to the mill in the form of chips in the amount needed to form the alloy, and within two minutes, in each case, the Block Copolymer B was fluxing on the mill. If the block copolymer had not previously been devolatilized small residual amounts of chlorobenzene and ϵcaprolactam monomer were seen to vaporize. As soon as the melt had been devolatilized, about 1 minute in each case, pellets of Polysulfone A were added to the fluxing Block Copolymer B on the mill in the amount needed to form the desired alloy. The Polysulfone A was quickly (about 3 minutes) homogeneously alloyed with the Block Copolymer B. The Samples of each Blends H to K were compression molded into 20 mil thick films at 250° C. and 5000 p.s.i. The films were then equilibrated with the moisture in the air for at least 24 hours at room temperature (25° C.). The films were then evaluated for various physical properties and the results of such tests are reported below in Table IX. The data shown in Table IX clearly demonstrates that the alloys of the present invention have excellent mechanical properties.

TABLE IX.—MECHANICAL PROPERTIES

| Sample | Percent wt. Nylon 6 | Tensile | | Percent | | Pendulum impact |
|---|---|---|---|---|---|---|
| | | Modulus (p.s.i.) | Strength (p.s.i.) | Yield elongation | Elongation at break | |
| Polysulfone A | 0 | 267,600 | 10,460 | 7.0 | 93 | 136 |
| Blend: | | | | | | |
| H | 7.5 | 262,900 | 9,790 | 7.5 | 31 | 95 |
| I | 15.0 | 240,200 | 8,900 | 7.0 | 53 | 101 |
| J | 30.0 | 244,000 | 8,400 | 8.0 | 64 | 97 |
| K | 40.0 | 217,000 | 8,000 | 10.0 | 51 | 9.7 |

EXAMPLE VII

The example illustrates the preparation of a block copolymer of the present invention using a hydroxyl terminated polysulfone polymer as the initiator.

The polysulfone initiator used was a dihydroxy terminated material having molecular weight of about 5,000. The reactions were conducted in bulk at temperatures of the order of about 195 and 240° C.

In a bulk reaction which was conducted at 195° C. 75 weight percent of ε-caprolactam and 25 weight percent of the polysulfone material was admixed with one mole percent, based on the amount of ε-caprolactam, of sodium hydride and the system was then subjected to polymerization temperature of 195° C. It required 33 minutes under these reaction conditions to provide the resulting block copolymer. When extracted with boiling methanol for 24 hours the resulting polymer was shown to contain 15 weight percent of methanol extractables. After being thus extracted the resulting block copolymer had a reduced viscosity of 2.78 dl./gm. in a 0.1 gm./100 milliliter solution in meta-cresol at 25° C.

A second charge of 75 weight percent of ε-caprolactam and 25 weight percent of the polysulfone material was heated until the monomer and polymer was soluble in each other and then 3 mol percent of sodium hydride based on ε-caprolactam were charged to the polymerization system. The polymerization system was heated to 237° C. and the polymerization time of 8 minutes was required in order to provide the desired block copolymer. The resulting block copolymer had a reduced viscosity, prior to methanol extraction procedures, of 0.70 dl./gm. When extracted with boiling methanol for 24 hours the polymer showed a methanol extractable value of 18%. The methanol extracted polymer had a reduced viscosity of 0.93 deciliter per gram (as a 0.1 gram per 100 ml. solution in meta-cresol at 25° C.).

The polymer prepared at 195° C. was compression molded at 3000 lbs. per square inch and at a temperature of about 250° C. to form a plaque which had the following physical properties:

Tensile modulus—146,000 p.s.i.
Tensile strength—7,500 p.s.i.
Elongation at break—160%
Pendulum impact—133 ft. lbs./cu. in.

The results indicate that the chain cleavage initiation reaction give products of quality that are essentially the same as those of the polymeric materials that are formed from polysulfone initiators having chlorine terminals.

A physical blend was provided of 50 wt. percent of the polymer prepared at 195° C. in bulk and 50 wt. percent of a polysulfone polymer having a molecular weight of 30,000 and a reduced viscosity of 0.5 deciliters per gram. This blend was compression molded at 250° C. to form a plaque which had the following properties:

Tensile modulus—225,000 p.s.i.
Tensile strength—8,100 p.s.i.
Yield at elongation—13%
Elongation at break—62%
Pendulum impact—74 lbs./cu. in.

The blend of polymers used therein had excellent environmental stress resistant properties.

The alloys of the present invention are unique semi-crystalline materials which have physical properties which are superior in various respects to either a homopolymer of the corresponding lactam or to the polyarylene polyether polymers. They are superior, for example, to the lactam homopolymers because they have higher heat distortion temperatures, particularly in the case where the lactam is ε-caprolactam and the lactam homopolymer is thus a nylon-6 polymer. The alloys also have lower hydrophilicity and better thermal stability properties than the corresponding lactam homopolymers. The alloys are also superior to the polyarylene polyether materials from which they are formed because they have improved stress crack resistance properties and improved resistance to various types of environments.

What is claimed is:
1. An alloy comprising
(a) 10 to 90 weight percent, based on the total weight percent of said alloy, of polylactam-polyarylene polyether block copolymer, and
(b) 90 to 10 weight percent, based on the total weight percent of said alloy, of at least one other polymeric material selected from the group consisting of nylon polymers and polyarylene polyether polymers, wherein the polyarylene polyether moiety of the (a) polymer and of the (b) polymer comprises about 2 to 500 repeating units of the structure:

$$\text{\{O—E—O—E'\}}$$

wherein E is the residuum of a dihydric phenol and E' is the residuum of benzenoid compound having an inert electron withdrawing group in at least one of the positions ortho and para to the valence bonds, both of said residua being valently bonded to the ether oxygen atoms through aromatic carbon atoms.

2. An alloy as in claim 1 wherein said block copolymer comprises one or more blocks of poly ε-caprolactam.

3. An alloy as in claim 2 wherein said block copolymer is a poly ε-caprolactam-polysulfone block copolymer.

4. An alloy as in claim 3 wherein said block copolymer comprises 20 to 80 weight percent of poly ε-caprolactam blocks and 80 to 20 weight percent of polysulfone blocks.

5. An alloy as in claim 4 which comprises 10 to 90 weight percent of said (b) nylon polymer.

6. An alloy as in claim 5 in which said (b) nylon polymer comprises poly-ε-caprolactam.

7. An alloy as in claim 4 which comprises 90 to 10 weight percent of said (b) polyarylene polyether polymer.

8. An alloy as in claim 7 in which said (b) polyarylene polyether polymer comprises polysulfone polymer.

9. An alloy as in claim 1 in which E is the residuum of a dinuclear dihydric phenol and E' is the residuum of a dinuclear benzenoid compound.

10. An alloyl as in claim 9 in which at least one of each of such (a) and (b) polymers comprises repeating units of the structure $$\left(\text{O}-\underset{(Y)_r}{\bigcirc}-R-\underset{(Y_1)_z}{\bigcirc}-O-\bigcirc-R'-\bigcirc\right)$$

wherein
R represents a member of the group consisting of a bond between aromatic carbon atoms and a divalent connecting radical,
R' represents a member of the group consisting of sulfone, carbonyl, vinyl, sulfoxide, azo, saturated fluorocarbon, organic phosphine oxide and ethylidene groups,
Y and $Y_1$ each represent inert substituent groups selected from the group consisting of halogen, $C_1$ to $C_4$ alkyl groups and $C_1$ to $C_4$ alkoxy groups, and
r and z are each integers having a value from 0 to 4 inclusive.

11. An alloy as in claim 10 in which r and z are each zero, R is a divalent connecting radical $C(R'')_2$ wherein R'' represents a member of the group consisting of H, lower alkyl, lower aryl and the halogen substituted groups thereof, and R' is a sulfone group.

References Cited
UNITED STATES PATENTS 3,207,713  9/1965  Hyde _____ 260—857
3,316,221  4/1967  Hyde _____ 260—857

PAUL LIEBERMAN, Primary Examiner

U.S. Cl. X.R.

260—47 C, 47 CZ, 47 R, 49, 50, 78 L, 857 R, 823, 857 G

UNITED STATES PATENT OFFICE
CERTIFICATE OF CORRECTION

Patent No. 3,655,822           Dated  April 11, 1972

Inventor(s)  J. E. McGrath et al.

It is certified that error appears in the above-identified patent and that said Letters Patent are hereby corrected as shown below:

Column 1, line 48, "reisstance" should read --resistance--.

Column 4, lines 26-30, the structure should read

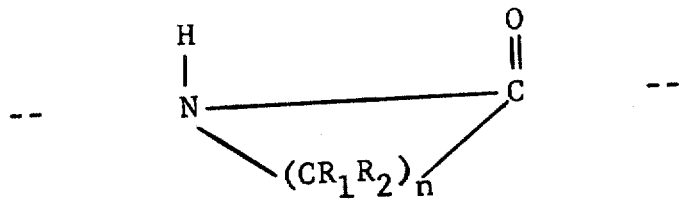

Column 4, lines 45-50, the structure should read

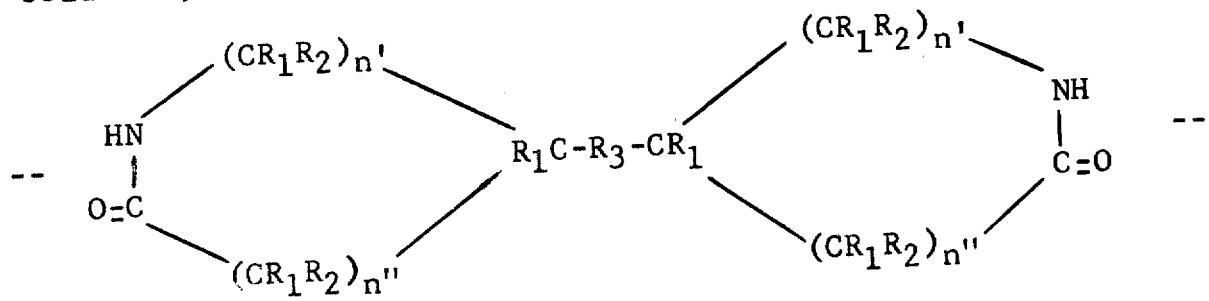

Column 5, line 6, "-AR-Hal" should read -- -Ar-Hal --.

Column 6, line 51, "phenol" should read --phenols--.

Column 8, line 35, the vinyl group should read

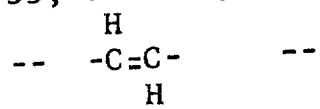

UNITED STATES PATENT OFFICE
CERTIFICATE OF CORRECTION

Patent No. 3,655,822  Dated April 11, 1972

Inventor(s) J. E. McGrath et al.  PAGE - 2

It is certified that error appears in the above-identified patent and that said Letters Patent are hereby corrected as shown below:

Column 9, lines 25-27, the structure should read

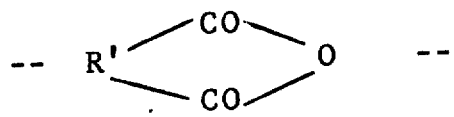

Column 10, the text of line 9 should appear on the line between structures III and IV(a).

Column 10, line 13, "copolymer" should read --copolymers--.

Column 10, line 44, that portion of the structure within the brackets should read -- -O-E-O-E' --.

Column 11, line 66, "CH" should read --OH--.

Column 12, line 4, "m-1" should read --$m_1$--.

Column 12, line 9, "m-2" should read --$m_2$--.

Column 12, line 24, "m-1" should read --$m_1$--.

Column 12, line 27, "wherein" should be deleted.

Column 12, lines 66-67 should read

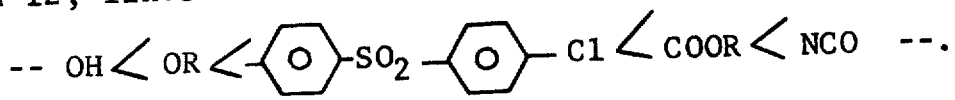

UNITED STATES PATENT OFFICE
CERTIFICATE OF CORRECTION

Patent No. 3,655,822     Dated April 11, 1972

Inventor(s) J. E. McGrath et al.     PAGE - 3

It is certified that error appears in the above-identified patent and that said Letters Patent are hereby corrected as shown below:

Column 13, line 5, "$\geq 0.25$" should read --$\leq 0.25$--.

Column 13, line 6, "$\geq 0.1$" should read --$\leq 0.1$--.

Column 13, lines 67-69 should read --(as 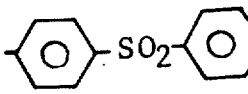--.

Column 20, in Table II, the HDT value for Blend A tested after 2 months at 50% R.H. should read --58--.

Column 19, in Table II, the identification of the samples tested after injection molding (dry) should read --Nylon A
  Blend A
        $B^1$
        C
        D
        $E^1$ --.

Column 22, line 58, "HC" should read --HCl--.

Column 26, line 37, "alloyl" should read --alloy--.

Column 26, that portion of the structure in claim 10 reading "$Y_1)_z$" should read --$(Y_1)_z$--.

Signed and sealed this 8th day of August 1972.

(SEAL)
Attest:

EDWARD M. FLETCHER, JR.
Attesting Officer

ROBERT GOTTSCHALK
Commissioner of Patents